(12) United States Patent
Grosser, Jr. et al.

(10) Patent No.: US 7,558,273 B1
(45) Date of Patent: Jul. 7, 2009

(54) METHODS AND SYSTEMS FOR ASSOCIATING AND TRANSLATING VIRTUAL LOCAL AREA NETWORK (VLAN) TAGS

(75) Inventors: Donald B. Grosser, Jr., Apex, NC (US); Charles E. Hudnall, Jr., Columbus, MS (US); Desikan Saravanan, Santa Clara, CA (US); Michael Yip, Los Altos, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 1168 days.

(21) Appl. No.: 10/745,412

(22) Filed: Dec. 23, 2003

(51) Int. Cl.
*H04L 12/28* (2006.01)

(52) U.S. Cl. .................. 370/395.53; 370/389

(58) Field of Classification Search .......... None
See application file for complete search history.

(56) References Cited

U.S. PATENT DOCUMENTS

| | | | | |
|---|---|---|---|---|
| 5,978,378 | A * | 11/1999 | Van Seters et al. | 370/401 |
| 6,128,666 | A | 10/2000 | Muller et al. | |
| 6,469,987 | B1 | 10/2002 | Rijhsinghani | |
| 6,515,993 | B1 | 2/2003 | Williams et al. | |
| 6,633,567 | B1 * | 10/2003 | Brown | 370/395.3 |
| 6,956,854 | B2 * | 10/2005 | Ganesh et al. | 370/392 |
| 7,133,409 | B1 * | 11/2006 | Willardson | 370/401 |
| 7,385,973 | B1 * | 6/2008 | Johnson et al. | 370/389 |
| 2003/0152075 | A1 * | 8/2003 | Hawthorne et al. | 370/389 |
| 2003/0188031 | A1 * | 10/2003 | Deikman et al. | 709/250 |

(Continued)

OTHER PUBLICATIONS

"Layer 2 switching, VLAN tagging, and Compact PCI, continued . . . ," CompactPCI Systems, http://www.compactpci-systems.com/soft_corner/archive/julAug2002/index.2.shtml, p. 1-2 (1997-2002).

(Continued)

*Primary Examiner*—Phirin Sam
(74) *Attorney, Agent, or Firm*—Jenkins, Wilson, Taylor & Hunt, P.A.

(57) ABSTRACT

Methods and systems for associating and translating VLAN tags are disclosed. In one implementation, multiple different member VLAN tags are associated with a translation VLAN tag. When a frame addressed to an unknown MAC address and containing one of the member VLAN tags is received, the frame is flooded to the translation VLAN and to ports associated with the source member VLAN other than the originating port. In the copy sent to the translation VLAN, the VLAN tag is replaced with the tag of the translation VLAN, for tagged ports. For untagged ports, the input VLAN tag may simply be stripped from the frames. When a layer 2 frame addressed to an unknown MAC address and containing the translation VLAN tag is received, the layer 2 frame is flooded to each of the member VLANs and to ports of the translation VLAN other than the originating port. The VLAN tag in the frames forwarded to each of the member VLANs may be replaced with the VLAN tag corresponding to each member VLAN, for tagged ports. For untagged ports, the input VLAN tag may simply be stripped from the frames. MAC address learning for frames received from member VLANs extends to the translation VLAN but not to other member VLANs. MAC address learning for frames from the translation VLAN extends to the member VLANs.

44 Claims, 9 Drawing Sheets

U.S. PATENT DOCUMENTS

2004/0032868 A1* 2/2004 Oda et al. ............... 370/389
2004/0165595 A1* 8/2004 Holmgren et al. ........ 370/395.3
2004/0252722 A1* 12/2004 Wybenga et al. ............ 370/474
2005/0058118 A1* 3/2005 Davis et al. ................ 370/351
2006/0143300 A1* 6/2006 See et al. .................. 709/227

OTHER PUBLICATIONS

"VLAN Information," USDavis, http://net21.ucdavis.edu/newvlan.htm, p. 1-13, (Oct. 29, 1998).

"Virtual LANs," Intel Corporation, p. 1-8, (1997).

* cited by examiner

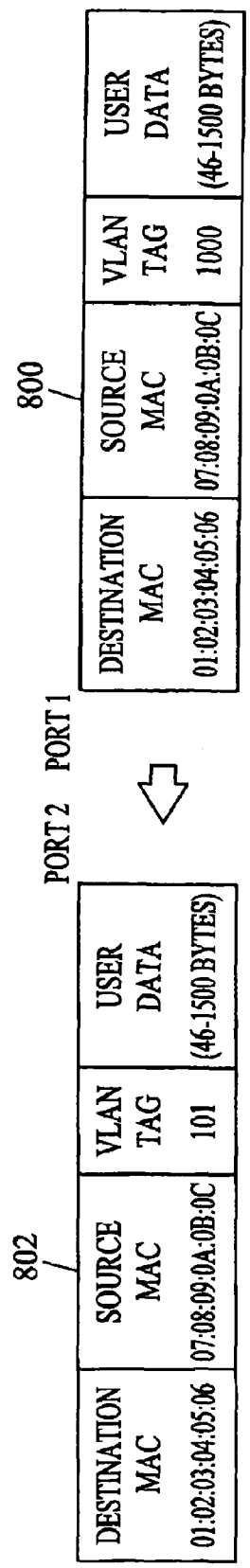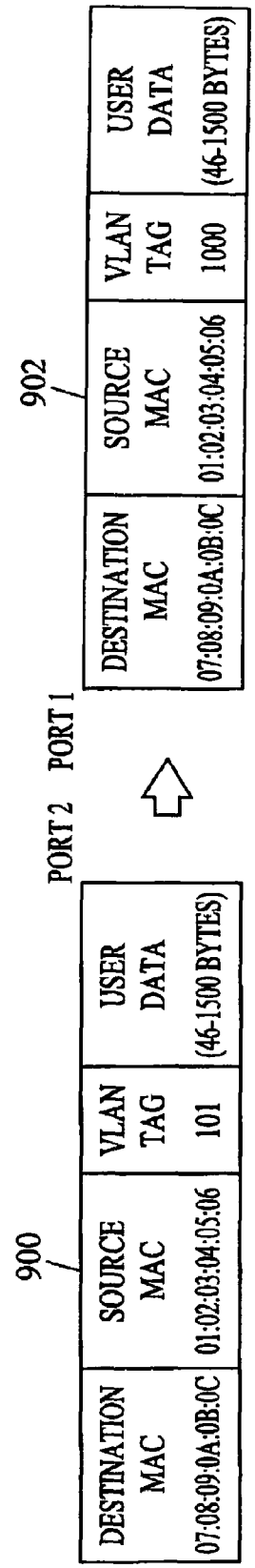
FIG. 8
FIG. 9

METHODS AND SYSTEMS FOR ASSOCIATING AND TRANSLATING VIRTUAL LOCAL AREA NETWORK (VLAN) TAGS

TECHNICAL FIELD

The present invention relates to methods and systems for layer 2 frame switching. More particularly, the present invention relates to methods and systems for associating and translating VLAN tags in layer 2 frame switching.

BACKGROUND ART

Local area networks (LANs) have been used to facilitate communications between end users connected to the same physical network. Individual LANs may be bridged to allow end users to communicate with other end users connected to different networks using layer 2 switches. Bridged LANs may be further interconnected with other bridged LANs using routers to form even larger communications networks. However, bridging and routing increase the processing load on machines that interconnect the various physical networks.

VLANs have been developed to address various deficiencies in bridged and routed networks and to allow LANs to be bridged in virtually any desired manner, independently of physical topology of the networks. VLANs can contain network traffic to a predefined set of ports in a layer 2 switch, thus eliminating the unnecessary use of bandwidth by broadcast and multicast frames. For example, layer 2 traffic that arrives at a switch is preferably only flooded onto output ports associated with the same VLAN. Without VLANs, layer 2 traffic for which no layer 2 forwarding database entry exists is flooded onto all output ports. Thus, using VLANs allows traffic to be contained within each VLAN for flooding purposes. The VLAN for a received frame is identified by a VLAN tag or the assigned VLAN tag for the receiving port. In most common VLAN implementations, the VLAN tag is a four-byte field between the link layer header and the network layer header of a frame. The VLAN tag contains a VLAN identifier and an associated user priority field. The term VLAN tag, as used herein, is intended to refer to the VLAN identifier portion of the VLAN tag, even though it is understood that a VLAN tag may include additional information.

Using current VLAN implementations, a layer 2 switch is not permitted to change the VLAN tag in an incoming frame to another VLAN tag in an outgoing frame. As a result, in order to interconnect VLANs that use different VLAN tags, it is necessary to provide a mechanism for mapping or coordinating VLAN tags used by the different networks. One potential solution to this problem is to stack VLAN tags in each frame. That is, when a frame arrives at a switch from a first VLAN and is destined for a second VLAN, the switch may add a second VLAN tag to the frame in addition to the first VLAN tag. The frame will be switched in the second VLAN using the second VLAN tag. When the frame leaves the second VLAN, the second VLAN tag is removed.

One problem with using VLAN tag stacking is that tag stacking only provides a mechanism for switching frames in the interconnecting network. When frames leave the interconnecting network, the same VLAN tags that were in the frames when they entered the interconnecting network must be used. In other words, there is no ability to expand the broadcast or flooding domain associated with the original VLANs. Another problem with tag stacking is that it increases the complexity in decoding frames in the interconnecting network. Accordingly, there exists a need for improved methods and systems for associating and translating VLAN tags in layer 2 frames.

DISCLOSURE OF THE INVENTION

The present invention includes methods and systems for translating VLANs in layer 2 frames, replacing VLANs in outgoing frames with the translated VLANs, and associating VLANs with other VLANs, thereby expanding the broadcast and flooding domains of the VLANs. In one implementation, a layer 2 frame addressed to an unknown MAC address is received at a switch. The VLAN tag in or associated with the layer 2 frame is translated to one or more different VLAN tags. If the VLAN tag in the layer 2 switch is of a first type, referred to herein as a member VLAN tag, the layer 2 frame may be flooded to a VLAN of a second type, referred to herein as a translation VLAN, and to the other ports of the source VLAN. Flooding preferably does not occur to the originating source port. The VLAN tag in the copy of the layer 2 frame sent to the translation VLAN may be translated to and replaced by a VLAN tag associated with the translation VLAN or stripped for untagged ports.

If the VLAN tag associated with the received layer 2 frame is a translation VLAN tag, copies of the layer 2 frame may then be created and flooded to member VLANs and to ports of the translation VLAN other than the source port. Each copy of the layer 2 frame may include a different VLAN tag than the input layer 2 frame. The different VLAN tags in the frame copies sent to the member VLANs may be associated with each member VLAN. By maintaining associations between VLANs and performing the VLAN translations, the layer 2 switch expands the broadcast and flooding domains of translation and member VLANs, while maintaining isolation between the traffic of member VLANs.

As used herein, the term "translation VLAN" refers to a VLAN with which multiple other VLANs are associated by a layer 2 switch. The term "member VLAN" refers to one of the VLANs that are associated with a translation VLAN. By defining translation and member VLANs in a layer 2 switch, traffic can be multiplexed and demultiplexed at layer 2. In addition, because VLANs are translated, rather than stacked, the decoding of layer 2 frames is simplified over tag stacking implementations.

In one implementation, a layer 2 switch includes a layer 2 forwarding table and an output tag table. The forwarding table includes entries that are indexed by a combination of destination MAC address and VLAN tag. The result of locating a matching entry in the forwarding table is an index to the output tag table. The output tag table includes replacement VLAN tags for outgoing frames. Multiple entries in the output tag table may be accessed in response to one lookup in the forwarding table when multiple copies of a received frame are being sent to different VLANs. Because the output tag table maintains multiple VLAN associations for a single input VLAN, efficient VLAN translations can be achieved.

Any of the methods and systems described herein can be implemented in hardware, software, firmware, or any combination thereof. Thus, the functional blocks described herein may be implemented by a computer program product comprising computer executable instructions embodied in a computer readable medium for performing the indicated function. Exemplary computer readable media in which the VLAN translation methods according to the present invention may be embodied include magnetic disks, optical disks, memory chips, or any other suitable device capable of storing instructions used to control a computer. In addition, a computer program product according to the invention may be embodied in an electrical signal downloadable via a computer network.

Accordingly, it is an object to provide methods and systems for translating VLAN tags in received layer 2 frames.

It is another object of the invention to provide methods and systems for associating member VLANs with a translation VLAN, while maintaining traffic separation between the member VLANs.

Some of the objects having been stated hereinabove, other objects will become evident as the description proceeds when taken in connection with the accompanying drawings as best described hereinbelow.

BRIEF DESCRIPTION OF THE DRAWINGS

Exemplary embodiments of the invention will now be explained with reference to the accompanying drawings, of which:

FIG. 8 is a schematic diagram representing the third of the four frames referenced with regard to FIG. 6; and FIG. 9 is a schematic diagram representing the second of the four frames referenced with regard to FIG. 6.

DETAILED DESCRIPTION OF THE INVENTION

Figure 1:
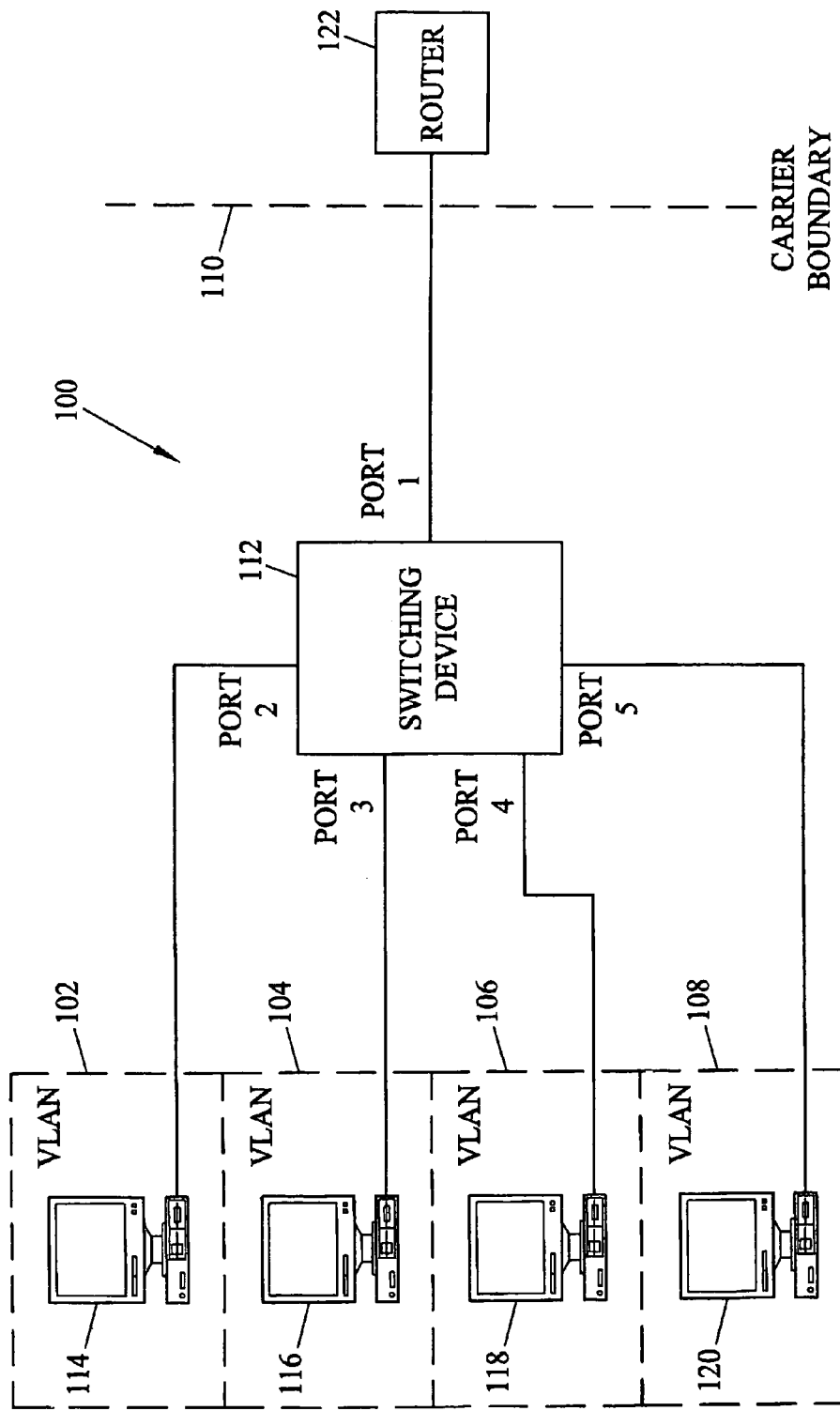
FIG. 1 is a schematic diagram of an exemplary network utilizing VLAN association and translation according to an embodiment of the invention.

Methods and systems for associating and translating VLAN tags in layer 2 frames can be implemented in any suitable layer 2 switching device in a network having a plurality of VLANs. FIG. 1 illustrates a schematic diagram of an exemplary network, generally designated 100, utilizing VLAN association and translation according to an embodiment of the present invention. Referring to FIG. 1, network 100 may include several member VLANs (designated by broken lines 102, 104, 106, and 108) having connection to one another and to a translation VLAN (designated by broken line 110) via a layer 2 switching device 112. Switching device 112 may include ports 1-5 having connection to VLANs 110, 102, 104, 106, and 108, respectively. Switching device 112 may forward frames received at one of ports 1-5 to one or more of VLANs 110, 102, 104, 106, and 108. Switching device 112 may also include more than one port (not shown) having connection to one of VLANs 102, 104, 106, 108, or 110.

VLANs 102, 104, 106, and 108 may include personal computers (PCs) 114, 116, 118, and 120, respectively, having unique media access control (MAC) addresses. VLANs 102, 104, 106, and 108 may also include other end node devices (not shown) having unique MAC addresses such as other PCs, server computers, printers, mainframe computers, etc. VLAN 110 can include a router 122 for receiving frames from switching device 112 for forwarding the frames to end node devices (not shown) of VLAN 110.

Using conventional layer 2 switching techniques, frames from VLANs 102, 104, 106, and 108 are limited to transmission in the associated VLANs because of the prohibition on replacing VLAN tags in outgoing frames. The present invention avoids this problem by maintaining associations between translation and member VLANs in switching device 112. Switching device 112 translates VLAN tags in received frames to the VLAN tags associated with the recipient VLANs. As a result, the broadcast and flooding domains of member and translation VLANs are expanded over conventional VLAN implementations.

Figure 2:
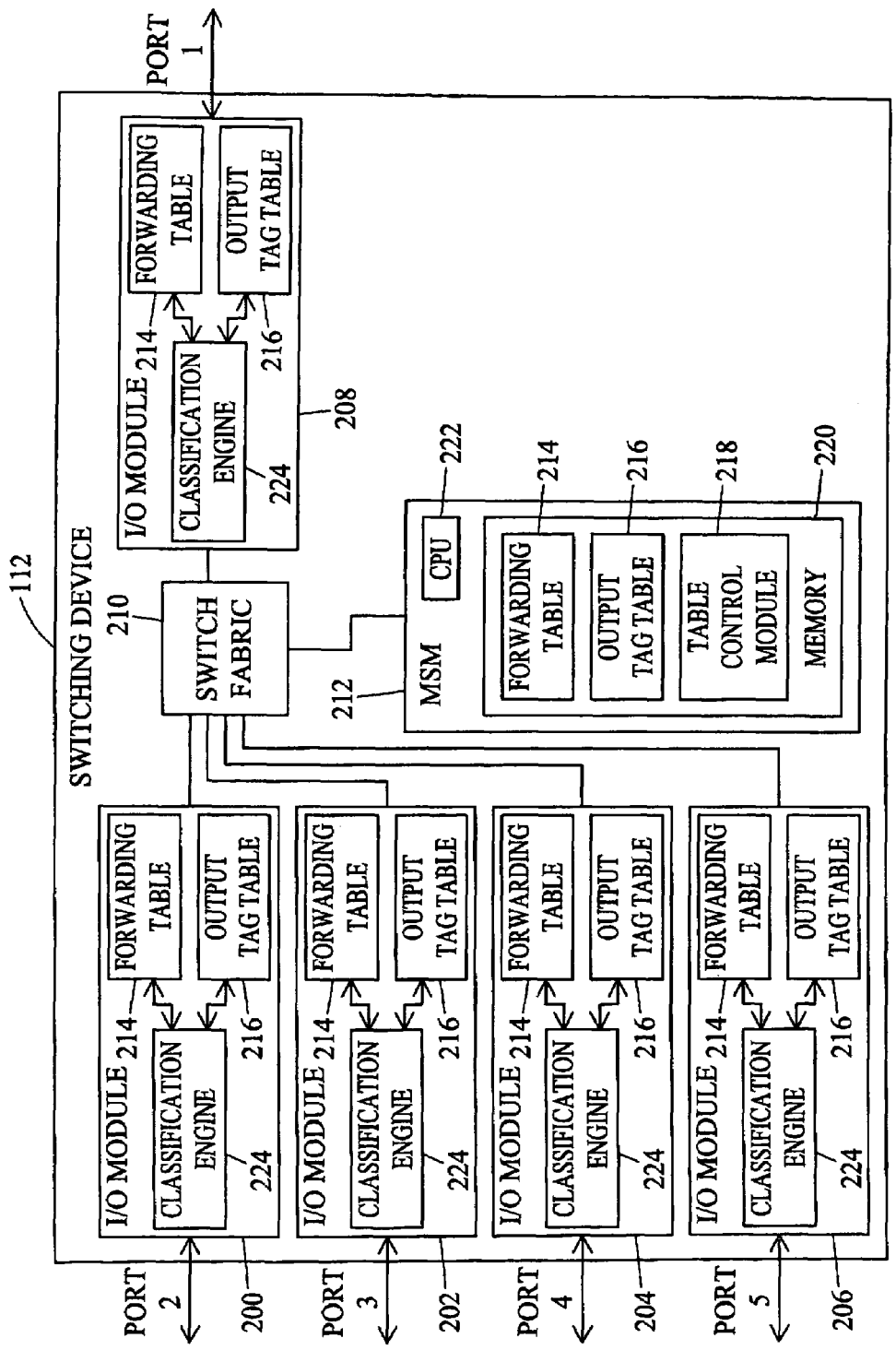
FIG. 2 is a block diagram of exemplary components of a switching device including VLAN translation capabilities according to an embodiment of the present invention.

FIG. 2 illustrates a block diagram of exemplary components of switching device 112. Switching device 112 can be implemented on any suitable underlying layer 2 platform, such as an Ethernet switch. Ethernet switches including underlying hardware platforms suitable for use with embodiments of the present invention include any of the BlackDiamond™ Alpine™, and Summit™ Ethernet switches available from Extreme Networks, Inc., of Santa Clara, Calif.

In the illustrated example, switching device 112 includes a plurality of input/output (I/O) modules 200, 202, 204, 206, and 208 associated with ports 2, 3, 4, 5, and 1, respectively. I/O modules 200, 202, 204, 206, and 208 may send and receive layer 2 frames over network 100 (shown in FIG. 1). I/O modules 200, 202, 204, and 206 may be connected to member VLANs 102, 104, 106, and 108 (shown in FIG. 1), respectively, for sending and receiving layer 2 frames to and from these VLANs. I/O module 208 may be connected to translation VLAN 110. I/O modules 200, 202, 204, 206, and 208 may be implemented as printed circuit boards plugged into slots in switching device 112. A switch fabric 210 may connect I/O modules 200, 202, 204, 206, and 208 to each other and to a management switch fabric module (MSM) 212. Switch fabric 210 can be any suitable type of switching fabric for transferring frames between ports and to and from MSM 212. In one exemplary embodiment, switch fabric 210 includes a plurality of gigabit Ethernet connections that can be managed by MSM 212.

Forwarding and Output Tag Tables

MSM 212 may maintain associations between translation and member VLANs and may also maintain forwarding tables. In the illustrated example, MSM 212 may include a forwarding table 214, an output tag table 216, and a table control module (TCM) 218 for performing MAC address learning, updating master copies of tables 214 and 216, and distributing the copies to the I/O modules. Forwarding table 214, output tag table 216, and table control module 218 may be stored in a memory 220 accessible by a central processing unit (CPU) 222.

Tables 214 and 216 may be distributed to each I/O module where these tables are used by classification engines 224 for frame classification and VLAN translation. Classification engines 224 forward frames and translate VLANs based on data in tables 214 and 216. Classification engines 224 may forward frames for which learning is required to TCM 218. Classification engines 224 may also receive and translate untagged and tagged frames.

Tables 214 and 216 may include information for identifying output ports associated with destination MAC addresses and translating VLANs. Table control module 218 may maintain tables 214 and 216 and implement a procedure to update tables 214 and 216 as new source MAC addresses are learned. Further, table control module 218 may initialize tables 214 and 216 with information for forwarding network frames and translating VLAN tags of the forwarded frames prior to enabling switching device 112 to receive frames.

Figure 3:
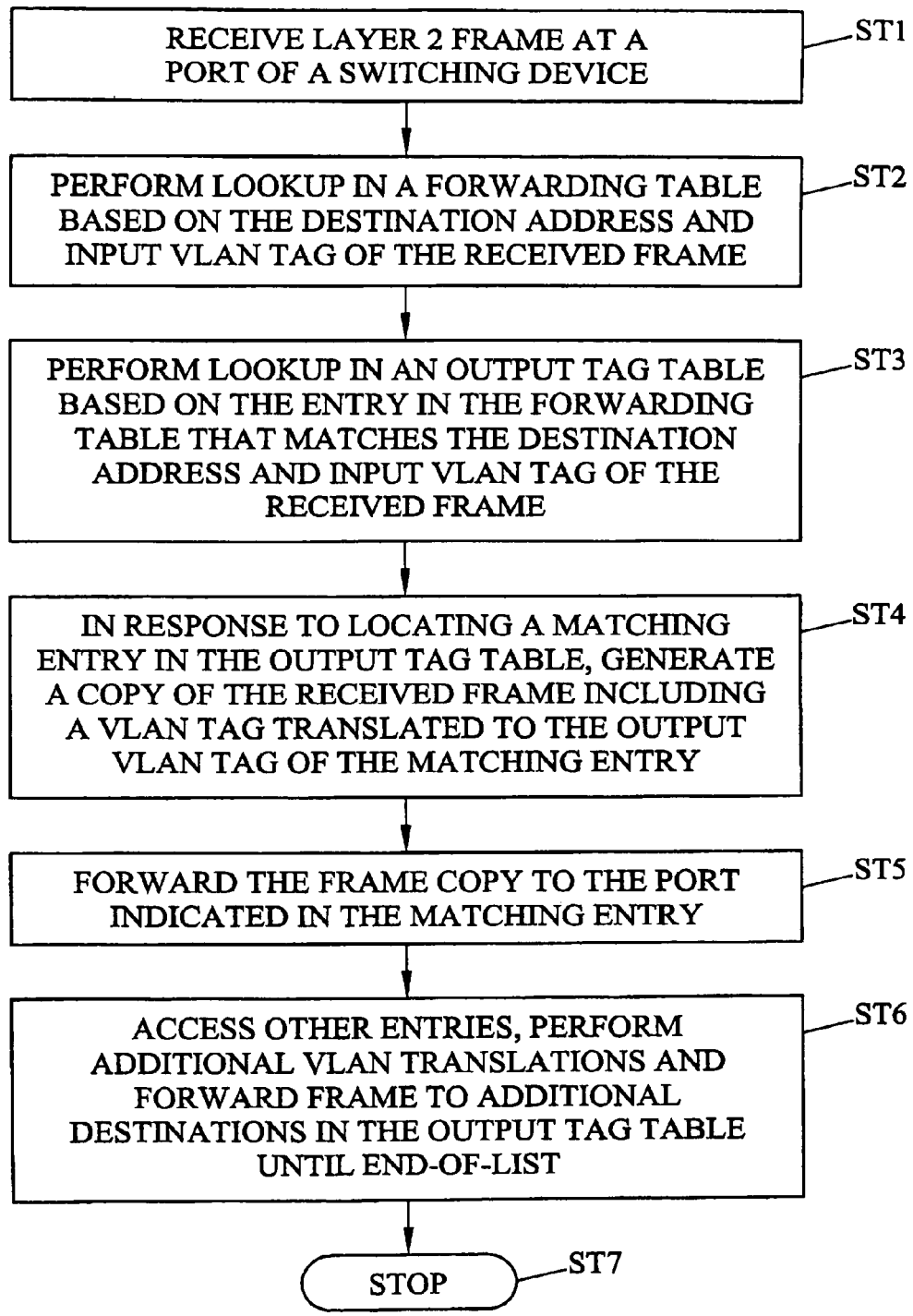
FIG. 3 is a flow chart illustrating exemplary steps that may be performed in forwarding a layer 2 frame to translation and member VLANs according to an embodiment of the present invention.

As stated above, layer 2 frame forwarding and VLAN translation may be implemented by classification engines 224 based on data in tables 214 and 216. FIG. 3 is a flow chart illustrating exemplary steps that may be performed by classification engines 224 in forwarding frames and translating VLANs. In step ST1, a layer 2 frame is received at a port of switching device 112. Next, at step ST2, classification engine 224 performs a lookup in forwarding table 214 based on the destination MAC address and input VLAN tag of the received frame. The input VLAN tag may be extracted from the frame for tagged frames or associated with the frame based on the input port for untagged frames. Forwarding table 214 may include an entry for matching the destination address and input VLAN tag of the received frame.

In one embodiment, forwarding table 214 may include a number of entries that each contain a destination MAC address and an input VLAN tag or other indicia for matching the destination MAC address and input VLAN tag of the received frame. The entries of forwarding table 214 may also include an output tag table index to be used in indexing output tag table 216. Table 1 shown below illustrates exemplary entries in forwarding table 214 and a brief description of each entry. In Table 1, it is assumed that specific MAC addresses have not yet been learned. Accordingly, Table 1 includes entries for broadcast and unknown unicast MAC addresses.

TABLE 1

Forwarding Table Before Learning Occurs

| Destination MAC | Input VLAN Tag | Output Tag Table (Table 2) Index | Comments |
| --- | --- | --- | --- |
| Broadcast | 1000 | 0 | Flood broadcast traffic to all ports in member VLANs and translation VLAN and send copy to CPU. |
| Unknown | 1000 | 1 | Flood unknown unicast to all ports in member VLANs and translation VLAN and send copy to CPU. |
| Broadcast | 101 | 6 | Flood broadcast traffic to all ports in member VLAN and translation VLAN and send copy to CPU. |
| Unknown | 101 | 7 | Flood unknown unicast to all ports in member VLAN and translation VLAN. |
| Broadcast | 102 | 9 | Flood broadcast traffic to all ports in member VLAN and translation VLAN and send copy to CPU. |
| Unknown | 102 | 10 | Flood unknown unicast to all ports in member VLAN and translation VLAN. |
| Broadcast | 103 | 12 | Flood broadcast traffic to all ports in member VLAN and translation VLAN and send copy to CPU. |
| Unknown | 103 | 13 | Flood unknown unicast to all ports in member VLAN and translation VLAN. |
| Broadcast | 104 | 15 | Flood broadcast traffic to all ports in member VLAN and translation VLAN and send copy to CPU. |
| Unknown | 104 | 16 | Flood unknown unicast to all ports in member VLAN and translation VLAN. |

In Table 1, each entry contains a unique combination of destination MAC address and input VLAN tag. VLAN translation can be implemented using the data in Table 1 when a frame is received by switching device 112. For example, when a frame is received at a port of switching device 112, a lookup may be performed in forwarding table 214 based on the destination MAC address and input VLAN tag extracted from the received frame. Based on the lookup, the output tag table index corresponding to the destination MAC address and input VLAN tag combination can be retrieved. The output tag table index may subsequently be used to perform a lookup in output tag table 216.

The destination MAC addresses in Table 1 are illustrated in text format. The text format includes "Unknown" to indicate unknown unicast layer 2 traffic and "Broadcast" to indicate layer 2 broadcast traffic. Broadcast destination traffic refers to frames destined for a broadcast MAC address. Unknown unicast destination traffic refers to frames that are to be forwarded to a destination MAC address that is not contained in forwarding table 214. It is understood that in the actual implementation of Table 1, binary values corresponding to actual destination MAC addresses would be present in this table. Table 1 also contains a Description column summarizing the handling of received network frames having the corresponding destination MAC address and input VLAN tag combination. It is understood that the information contained in the Description column of Table 1 is for illustrative purposes and may not be included in forwarding table 214.

Referring again to FIG. 3, at step ST3, a lookup may be performed in output tag table 216 based on the entry in forwarding table 214 matching the destination address and input VLAN tag of the received frame. In one embodiment, output tag table 216 includes entries indexed by the results of the forwarding table lookups. The entries of output tag table 216 contain the output port and output VLAN tag for the forwarded frame. In one embodiment, output tag table 216 may include a number of entries that each contain an output tag table index, an output port number or other indicia for identifying a port of the switching device, an output VLAN tag number or other indicia for identifying a VLAN tag, and a next output tag table index. Table 2 shown below illustrates exemplary entries for an output tag table that contains entries corresponding to the exemplary forwarding table illustrated in Table 1 above. In the illustrated example, Table 2 also includes a brief description for the entries in the Description column. Such descriptions are included for illustrative purposes only and may not be included in an actual implementation of the output tag table.

TABLE 2

Output Tag Table

| Output Tag Table Index | Output Port | Output VLAN Tag | Next Output Tag Table Index | Description | Strip Tag? |
|---|---|---|---|---|---|
| 0 | TCM | 1000 | 1 | Fwd to TCM for local processing | N |
| 1 | 1 | 1000 | 2 | Fwd to all ports of translation VLAN | N |
| 2 | 2 | 101 | 3 | Fwd to all ports of all member VLANs | N |
| 3 | 3 | 102 | 4 | | N |
| 4 | 4 | 103 | 5 | | N |
| 5 | 5 | 104 | End-of-List | | N |
| 6 | TCM | 101 | 7 | Fwd to TCM for local processing | N |
| 7 | 2 | 101 | 8 | Fwd to all ports of member VLAN | N |
| 8 | 1 | 1000 | End-of-List | Fwd to all ports of translation VLAN | N |
| 9 | TCM | 102 | 10 | Fwd to TCM for local processing | N |
| 10 | 3 | 102 | 11 | Fwd to all ports of member VLAN | N |
| 11 | 1 | 1000 | End-of-List | Fwd to all ports of translation VLAN | N |
| 12 | TCM | 103 | 13 | Fwd to TCM for local processing | N |
| 13 | 4 | 103 | 14 | Fwd to all ports of member VLAN | N |
| 14 | 1 | 1000 | End-of-List | Fwd to al ports of translation VLAN | N |
| 15 | TCM | 104 | 16 | Fwd to TCM for local processing | N |
| 16 | 5 | 104 | 17 | Fwd to all ports of member VLAN | N |
| 17 | 1 | 1000 | End-of-List | Fwd to all ports of translation VLAN | N |
| 18 | 2 | 101 | End-of-List | Learned entry: Fwd to specific port of member VLAN | N |

TABLE 2-continued

Output Tag Table

| Output Tag Table Index | Output Port | Output VLAN Tag | Next Output Tag Table Index | Description | Strip Tag? |
|---|---|---|---|---|---|
| 19 | 1 | 1000 | End-of-List | Learned entry: Fwd to specific port of translation VLAN | N |

As illustrated in Table 2, each entry in the output tag table includes a unique output tag table index. As noted above, the output tag table index retrieved by a lookup in forwarding table 214 can be matched to an output tag table index in output tag table 216. A matching output tag table index in the output tag table corresponds to an output port number, an output VLAN tag number, and a next output tag index.

In Table 2, the last column indicates whether a VLAN tag should be included or not in the outbound frame. In the illustrated example, all of the output ports are assumed to be tagged. Thus, the entries are labeled "N" indicating that the VLAN tag should not be stripped from the outbound frame. If any of the entries in Table 2 were marked "Y", it would indicate that the corresponding output port is untagged. In this situation, the input VLAN tag would be stripped from the outbound frame and no VLAN tag would be included in the outbound frame, even though the input frame may have included a VLAN tag.

In Table 2, the output port information is illustrated in numeric and text formats. It is understood that in the actual implementation of Table 2, binary values identifying the actual output port would be present in this table. The output port information in this exemplary output tag table is illustrated in numeric format (1-5) and text format (TCM). The output port information shown in numeric format corresponds to the ports 1-5 of switching device 112. The output VLAN tag information in text format (TCM) corresponds to table control module 218.

Referring again to FIG. 3, at step ST4, in response to locating a matching entry in output tag table 216, a copy of the received frame is generated. In the frame copy, the VLAN tag is translated to the output VLAN tag of the matching entry. If the output port is tagged, the output VLAN tag may be included in the outgoing frame. If the output port is untagged, the VLAN tag may not be included in the outbound frame, and the input tag may be stripped from such frames. At step ST5, the frame copy may be forwarded to the port indicated in the matching entry. Next, additional entries in the output tag table may be accessed based on the next output tag associated with each entry until an entry with the next entry set to end of list is reached (step ST6). The frame may be forwarded to destinations associated with each entry with different VLAN tags being inserted in the frame for different destinations. Using such a scheme, multiple VLAN translations can be performed for a received frame using a single forwarding database lookup. As a result, the time required to perform multiple VLAN translations is reduced. The process stops at step ST7.

Initializing the Forwarding and Output Tag Tables

Prior to enabling switching device 112 to receive layer 2 traffic for switching, forwarding and output tag tables 214 and 216 are preferably initialized with information for forwarding layer 2 frames and translating VLAN tags of the forwarded frames. Table control module 218 may enter initialization information into the forwarding and output tag tables 214 and 216 according to an initialization procedure. According to one embodiment, forwarding and output tag tables 214 and 216 may be initialized to support broadcast destination and unknown unicast destination traffic originating from the translation VLAN and each member VLAN. Frames having unknown source MAC addresses can be forwarded to TCM 218 for learning as described below.

Figure 4:
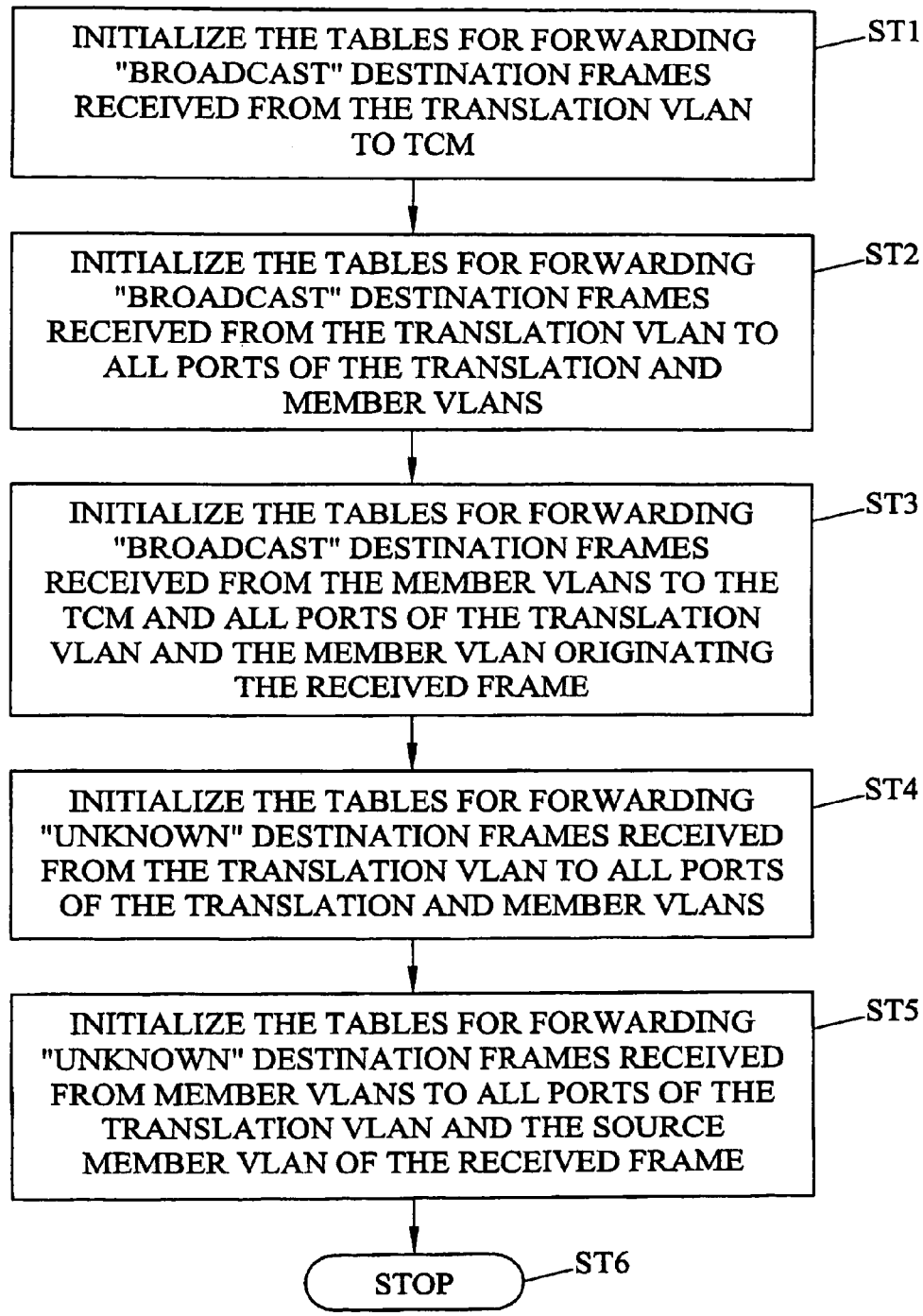
FIG. 4 is a flow chart illustrating exemplary steps that may be performed by a table control module in initializing forwarding and output tag tables with data prior to enabling a switching device to receive layer 2 traffic according to an embodiment of the present invention.

FIG. 4 is a flow chart illustrating exemplary steps that may be performed by table control module 218 in initializing forwarding and output tag tables 214 and 216 with data prior to enabling switching device 112 to receive network traffic. Tables 1 and 2 above contain initialization data and are referenced with regard to this description of FIG. 4 provided herein to illustrate exemplary initialization data that can be entered into forwarding and output tag tables 214 and 216. The output tag indexes are provided to associate the data contained in Table 1 with the data contained in Table 2. In Table 1, the translation VLAN (such as VLAN 110 shown in FIG. 1) is represented by VLAN tag number 1000. Additionally, member VLANs (such as VLANs 102, 104, 106, and 108 shown in FIG. 1) are represented by VLAN tag numbers 101, 102, 103, and 104.

Referring to FIG. 4, in step ST1, entries in forwarding and output tag tables 214 and 216 may be initialized to forward "broadcast" destination frames received from the translation VLAN to table control module 218 for MAC address learning and any other necessary processing. Referring to Table 1, the entry corresponding to output tag table index 0 has been initialized to match a "broadcast" destination frame originating from the translation VLAN (in this example, a frame having VLAN tag 1000). Referring to the entry in Table 1 having output tag table index 0, the destination MAC address is initialized to "Broadcast" and the input VLAN tag is initialized with 1000 for matching frames indicating a "broadcast" destination MAC address and originating from VLAN 1000, indicating origination from the translation VLAN. Such a match in Table 1 returns an output tag table index 0 for lookup in output tag table 216.

Output tag table 216 may be initialized with an entry to match an output tag table index returned from a match in the forwarding table of a "broadcast" destination frame originating from a translation VLAN. As stated above, output table index 0 is returned for this match in Table 1. Referring now to Table 2 above, an entry has been initialized for index 0. The output port data for this entry set to "TCM", indicating that the frame should be forwarded to table control module 218 for local processing. The output VLAN tag of this entry is 1000 for indicating the frame copy forwarded to table control module 218 should have output VLAN tag 1000, which is the same as the input VLAN tag.

The present invention is not limited to forwarding and output tag tables that associate a single translation VLAN with member VLANs. A layer 2 switch of the present invention may include forwarding and output tag tables that associated a plurality of different translation VLANs with a plurality of different member VLANs without departing from the scope of the invention.

In step ST2 of FIG. 4, forwarding and output tag tables 214 and 216 may also be initialized to forward "broadcast" destination frames received from the translation VLAN to all ports of the translation VLAN and all ports of the member VLANs. As described above, the forwarding data shown in Table 1 has been initialized to return an output tag table index of 0 when a "broadcast" destination frame is received from the translation VLAN. The output tag data shown in Table 2 has been initialized with an index of 0 for lookup when an output tag table index of 0 is returned from the forwarding table. The entry in Table 2 corresponding to index 0 includes a next output tag table index of 1 to indicate that a lookup is to be performed in output tag table 216 for index 1.

The entry of Table 2 having index 1 includes data for forwarding a copy of the frame to all ports corresponding the translation VLAN. In this example, output port 1 is the translation VLAN. The output VLAN tag for this entry is 1000 for indicating that the frame copy forwarded to port 1 is to have an output VLAN tag of 1000. The entry also includes a next output tag table index of 2 to indicate that a lookup is to be performed in output tag table 216 for index 2.

In order to send the broadcast frame from the translation VLAN to the member VLANs, the entries in Table 2 corresponding to indices 2-5 are accessed in sequence. The index 2 entry of Table 2 includes an output port of 2 and an output VLAN tag of 101 to forward a copy of a received frame having an output VLAN tag of 101 to output port 2. Output port 2 corresponds to the output VLAN having tag 101. Thus, the VLAN tag of the frame is translated from 1000 to 101. The index 2 entry also includes a next output tag table index of 3 to indicate that a lookup is to be performed in output tag table 216 for index 3.

The entry of Table 2 having an index 3 includes an output port of 3 and an output VLAN tag of 102 to forward a copy of a received frame having an output VLAN tag of 102 to output port 3. Output port 3 corresponds to the output VLAN having tag 102. Thus, the VLAN tag of the frame is translated from 1000 to 102. The index 3 entry also includes a next output tag table index of 4 to indicate that a lookup is to be performed in output tag table 216 for index 4.

The entry of Table 2 having an index 4 includes an output port of 4 and an output VLAN tag of 103 to forward a copy of a received frame having an output VLAN tag of 103 to output port 4. Output port 4 corresponds to the output VLAN having tag 103. Thus, the VLAN tag of the frame is translated from 1000 to 103. The index 4 entry also includes a next output tag table index of 5 to indicate that a lookup is to be performed in output tag table 216 for index 5.

The entry of Table 2 having an index 5 includes an output port of 5 and an output VLAN tag of 104 for forwarding a copy of a received frame having an output VLAN tag of 104 to output port 5. Output port 5 corresponds to the output VLAN having tag 104. Thus, the VLAN tag of the frame is translated from 1000 to 104. The index 5 entry also includes a next output tag table index of "End-of-List" to indicate that no more lookups are to be performed for this received frame in output tag table 216. Thus, by initializing the output tag table to perform multiple different VLAN translations for a received frame, such translations may be triggered by a single forwarding database lookup. As a result, the VLAN translations are performed in an efficient manner.

In step ST3 of FIG. 4, forwarding and output tag tables 214 and 216 may be initialized to forward "broadcast" destination frames received from the member VLANs to table control module 218 and all ports of the translation VLAN and the member VLAN originating the received frame. For example, the forwarding table shown in Table 1 has been initialized to return an output tag table index of 6, 9, 12, and 15 for "broadcast" destination frames having an input VLAN tag of 101, 102, 103, and 104, respectively, which corresponds to a member VLAN. As a result, a "broadcast" destination frame having an input VLAN tag of 101, 102, 103, or 104 may return an output tag table index of 6, 9, 12, or 15, respectively, for lookup in the forwarding table shown in Table 1.

The entries of output tag table 216 shown in Table 2 may be initialized with output tag table indexes of 6, 9, 12, and 15 to match indexes retrieved from Table 1. The Table 2 entry having index 6 includes an output port "TCM" and an output VLAN tag of 101 for forwarding a copy of a received frame having an output VLAN tag 101 to table control module 218 for further processing. Therefore, a copy of a received "broadcast" destination frame having an input VLAN tag of 101 may be forwarded to table control module 218 with an output VLAN tag of 101 based on the initialization of forwarding and output tag tables 214 and 216. The entry also includes a next output tag table index of 7 to indicate that a lookup is to be performed in output tag table 216 for index 7.

The Table 2 entry having index 7 includes an output port of 2 and an output VLAN tag of 101 for forwarding a copy of a received frame having an output VLAN tag of 101 to output port 2. Output port 2 corresponds to the output VLAN having tag 101. The index 7 entry also includes a next output tag table index of 8 to indicate that a lookup is to be performed in output tag table 216 for index 8.

The Table 2 entry having an index 8 includes an output port of 1 and an output VLAN tag of 1000 for forwarding a copy of a received frame having an output VLAN tag of 1000 to output port 1. Output port 1 corresponds to the translation VLAN. The index 8 entry also includes a next output tag table index of "End-of-List" to indicate that no more lookups are to be performed for this received frame in output tag table 216.

The Table 2 entry having index 9 includes an output port "TCM" and an output VLAN tag of 102 to forward a copy of a received frame having an output VLAN tag 102 to table control module 218 for further processing. Therefore, a copy of a received "broadcast" destination frame having an input VLAN tag of 102 may be forwarded to table control module 218 with an output VLAN tag of 102 based on the initialization of the forwarding and output tag table. The entry also includes a next output tag table index of 10 to indicate that a lookup is to be performed in output tag table 216 for index 10.

The Table 2 entry having index 10 includes an output port of 3 and an output VLAN tag of 102 to forward a copy of a received frame having an output VLAN tag of 102 to output port 3. Output port 3 corresponds to the output VLAN having tag 102. The index 10 entry also includes a next output tag table index of 11 to indicate that a lookup is to be performed in output tag table 216 for index 11.

The Table 2 entry having index 11 includes an output port of 1 and an output VLAN tag of 1000 to forward a copy of a received frame having an output VLAN tag of 1000 to output port 1. Output port 1 corresponds to the translation VLAN. The index 11 entry also includes a next output tag table index of "End-of-List" to indicate that no more lookups are to be performed for this received frame in output tag table 216.

The Table 2 entry having index 12 includes an output port "TCM" and an output VLAN tag of 103 to forward a copy of a received frame having an output VLAN tag 103 to table control module 218 for further processing. Therefore, a copy of a received "broadcast" destination frame having an input VLAN tag of 101 may be forwarded to table control module 218 with an output VLAN tag of 103 based on the initialization of forwarding and output tag tables 214 and 216. The entry also includes a next output tag table index of 13 to indicate that a lookup is to be performed in the output tag table for index 13.

The Table 2 entry having index 13 includes an output port of 4 and an output VLAN tag of 103 to forward a copy of a received frame having an output VLAN tag of 103 to output port 4. Output port 4 corresponds to the output VLAN having tag 103. The index 13 entry also includes a next output tag table index of 14 to indicate that a lookup is to be performed in output tag table 216 for index 14.

The Table 2 entry having index 14 includes an output port of 1 and an output VLAN tag of 1000 to forward a copy of a received frame having an output VLAN tag of 1000 to output port 1. Output port 1 corresponds to the translation VLAN. The index 14 entry also includes a next output tag table index of "End-of-List" to indicate that no more lookups are to be performed for this received frame in output tag table 216.

The Table 2 entry having index 15 includes an output port "TCM" and an output VLAN tag of 104 to forward a copy of a received frame having an output VLAN tag 104 to table control module 218 for further processing. Therefore, a copy of a received "broadcast" destination frame having an input VLAN tag of 104 may be forwarded to table control module 218 with an output VLAN tag of 104 based on the initialization of forwarding and output tag tables 214 and 216. The entry also includes a next output tag table index of 16 to indicate that a lookup is to be performed in output tag table 216 for index 16.

The Table 2 entry having index 16 includes an output port of 5 and an output VLAN tag of 104 to forward a copy of a received frame having an output VLAN tag of 104 to output port 5. Output port 5 corresponds to the output VLAN having tag 104. The index 16 entry also includes a next output tag table index of 17 to indicate that a lookup is to be performed in output tag table 216 for index 17.

The Table 2 entry having index 17 includes an output port of 1 and an output VLAN tag of 1000 to forward a copy of a received frame having an output VLAN tag of 1000 to output port 1. Output port 1 corresponds to the translation VLAN. The index 17 entry also includes a next output tag table index of "End-of-List" to indicate that no more lookups are to be performed for this received frame in output tag table 216. Thus, by initializing output tag table 216 to send broadcast frames from a member VLAN addressed to all ports associated with the originating member VLAN, the translation VLAN, and the TCM based on a single forwarding table lookup, VLAN translations are performed in an efficient manner. In addition, the broadcast domain for the received frame is expanded over conventional VLAN implementations that limit broadcasting on a per-VLAN basis.

In step ST4 of FIG. 4, the forwarding and output tag tables may be initialized to forward "unknown" destination frames received from the translation VLAN to all ports of the translation VLAN and all ports of the member VLANs. As described above, the forwarding data shown in Table 1 has been initialized to return an output tag table index of 1 when an "unknown" destination frame is received from the translation VLAN. The Table 2 entry having index 1 includes data for forwarding a copy of the frame to all ports of the translation VLAN. In this example, output port 1 is associated the translation VLAN. The output VLAN tag for this entry is 1000, indicating that the frame copy forwarded to port 1 is to have an output VLAN tag of 1000. The entry also includes a next output tag table index of 2 to indicate that a lookup is to be performed in the output tag table for index 2. The output tag table entries corresponding to indices 2-5 are accessed in sequence for sending frame copies to all of the ports of the member VLANs. The frames output to each member VLAN may include a different VLAN identifier. Thus, by initializing output tag table 216 to send frames from a translation VLAN addressed to an unknown MAC address to all ports associated with the member and translation VLAN (other than the originating port) based on a single forwarding table lookup, VLAN translation efficiency is achieved. In addition, the flooding domain of the translation VLAN is expanded to include the member VLANs.

In step ST5 of FIG. 4, forwarding and output tag tables 214 and 216 may be initialized to forward "unknown" destination frames received from member VLANs to all ports of the translation VLAN and the source member VLAN of the received frame. For example, the forwarding table shown in Table 1 has been initialized to return an output tag table index of 7, 10, 13, and 16 for "unknown" destination frames having an input VLAN tag of 101, 102, 103, and 104, respectively. As a result, "unknown" destination frames having an input VLAN tag of 101, 102, 103, or 104 may return an output tag table index of 7, 10, 13, or 16, respectively, for lookup in the output tag table shown in Table 2.

The entries of the output tag data shown in Table 2 may be initialized with output tag table indexes of 7, 10, 13, and 16. The Table 2 entry having index 7 includes an output port of 2 and an output VLAN tag of 101 for forwarding a copy of a received frame having an output VLAN tag of 101 to output port 2. Output port 2 corresponds to the VLAN having tag 101. The index 7 entry also includes a next output tag table index of 8 to indicate that a lookup is to be performed in output tag table 216 for index 8.

The Table 2 entry having index 8 includes an output port of 1 and an output VLAN tag of 1000 for forwarding a copy of a received frame having an output VLAN tag of 1000 to output port 1. Output port 1 corresponds to the translation VLAN. The index 8 entry also includes a next output tag table index of "End-of-List" to indicate that no more lookups are to be performed for this received frame in output tag table 216.

The Table 2 entry having index 10 includes an output port of 3 and an output VLAN tag of 102 for forwarding a copy of a received frame having an output VLAN tag of 102 to output port 3. Output port 3 corresponds to the output VLAN having tag 102. The index 10 entry also includes a next output tag table index of 11 to indicate that a lookup is to be performed in output tag table 216 for index 11.

The Table 2 entry having index 11 includes an output port of 1 and an output VLAN tag of 1000 for forwarding a copy of a received frame having an output VLAN tag of 1000 to output port 1. Output port 1 corresponds to the translation VLAN. The index 11 entry also includes a next output tag table index of "End-of-List" to indicate that no more lookups are to be performed for this received frame in output tag table 216.

The Table 2 entry having index 13 includes an output port of 4 and an output VLAN tag of 103 for forwarding a copy of a received frame having an output VLAN tag of 103 to output port 4. Output port 4 corresponds to the output VLAN having tag 103. The index 13 entry also includes a next output tag table index of 14 to indicate that a lookup is to be performed in output tag table 216 for index 14.

The entry in Table 2 having index 14 includes an output port of 1 and an output VLAN tag of 1000 for forwarding a copy of a received frame having an output VLAN tag of 1000 to output port 1. Output port 1 corresponds to the translation VLAN. The index 14 entry also includes a next output tag table index of "End-of-List" to indicate that no more lookups are to be performed for this received frame in output tag table 216.

The Table 2 entry having index 16 includes an output port of 5 and an output VLAN tag of 104 for forwarding a copy of a received frame having an output VLAN tag of 104 to output port 5. Output port 5 corresponds to the output VLAN having tag 104. The index 16 entry also includes a next output tag table index of 17 to indicate that a lookup is to be performed in output tag table 216 for index 17.

The Table 2 entry having index 17 includes an output port of 1 and an output VLAN tag of 1000 for forwarding a copy of a received frame having an output VLAN tag of 1000 to output port 1. Output port 1 corresponds to the translation VLAN. The index 17 entry also includes a next output tag table index of "End-of-List" to indicate that no more lookups are to be performed for this received frame in output tag table 216. Thus, by initializing output tag table 216 to forward frames address to unknown MAC addresses from member VLANs to all ports of the translation and the source member VLAN based on a single forwarding table lookup, VLAN translation efficiency is achieved. In addition, the flooding domain for the received frame is expanded over conventional VLAN implementations that limit flooding on a per-VLAN basis. However, flooding preferably does not extend to other member VLANs, thus providing security among member VLANs.

Returning to FIG. 4, in step ST6, the initialization process ends. Once the initialization process is complete, switching device 112 may be enabled to receive layer 2 traffic. As will be described in detail below, switching device 112 performs MAC address learning in a manner that associates, in forwarding table 114, MAC addresses on member VLANs with the source VLAN and the translation VLAN but not with other member VLANs. As such, MAC addresses learned for the member VLANs will be accessible to incoming frames from the translation and from the source member VLAN. In addition, MAC addresses learned for the translation VLAN will be accessible to incoming frames from the translation VLAN and from the member VLANs.

The present invention is not limited to having separate forwarding and output tag tables. In an alternate implementation of the invention, forwarding and output tag tables 214 and 216 may be combined without departing from the scope of the invention. In addition, the present invention is not limited to data that is arranged in tabular format. It is understood that any suitable data structure that allows layer 2 frame forwarding with VLAN translation in the manner described herein is intended to be within the scope of the invention.

Learning Unknown Source MAC Addresses

The initialization of forwarding and output tag tables 214 and 216 may support forwarding broadcast and unknown unicast layer 2 traffic. In addition, specific MAC addresses may be learned on the fly and associated with the proper VLAN or VLANs. For example, frames with unknown source MAC addresses may be passed to table control module 218 so that these addresses may be learned and associated with the proper VLANs. The learned MAC addresses and VLAN associations may be stored in forwarding and output tag tables 214 and 216 resident on MSM 212. MSM 212 may distribute copies of the tables to the I/O modules.

The present invention is not limited to performing MAC address learning and VLAN association on a centralized module, such as MSM 212. In an alternate implementation, each I/O module may perform MAC address learning and associate learned MAC addresses with VLANs. Each I/O module may distribute the learned MAC addresses and VLAN associations to other I/O modules associated with the same VLAN or VLAN group. Thus, MAC address learning and VLAN association according to the present invention may be centralized or distributed, without departing from the scope of the invention.

Figure 5A:
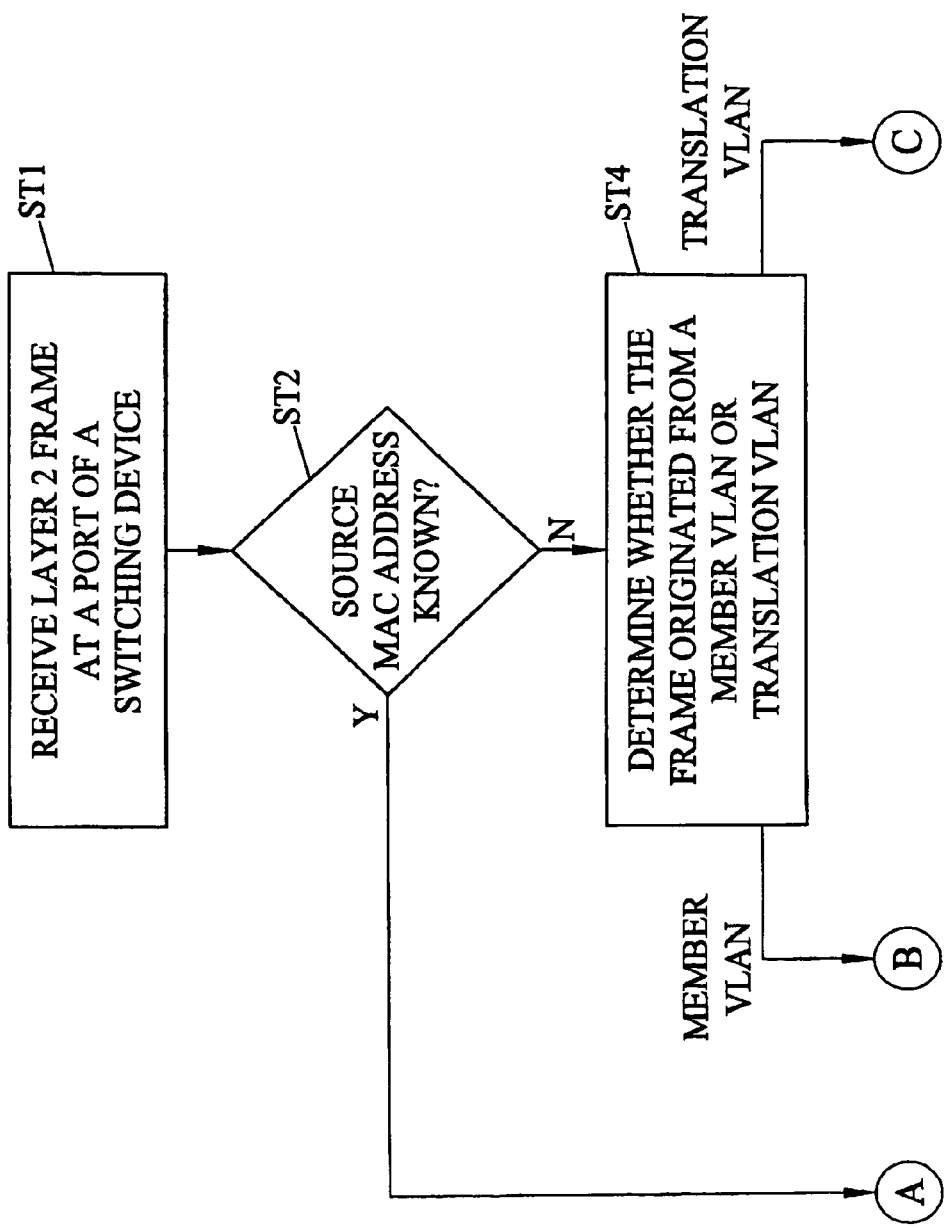
FIGS. 5A and 5B are a flow chart illustrating exemplary steps that may be performed by a table control module in learning unknown source MAC addresses from received layer 2 frames according to an embodiment of the present invention.
Figure 5B:
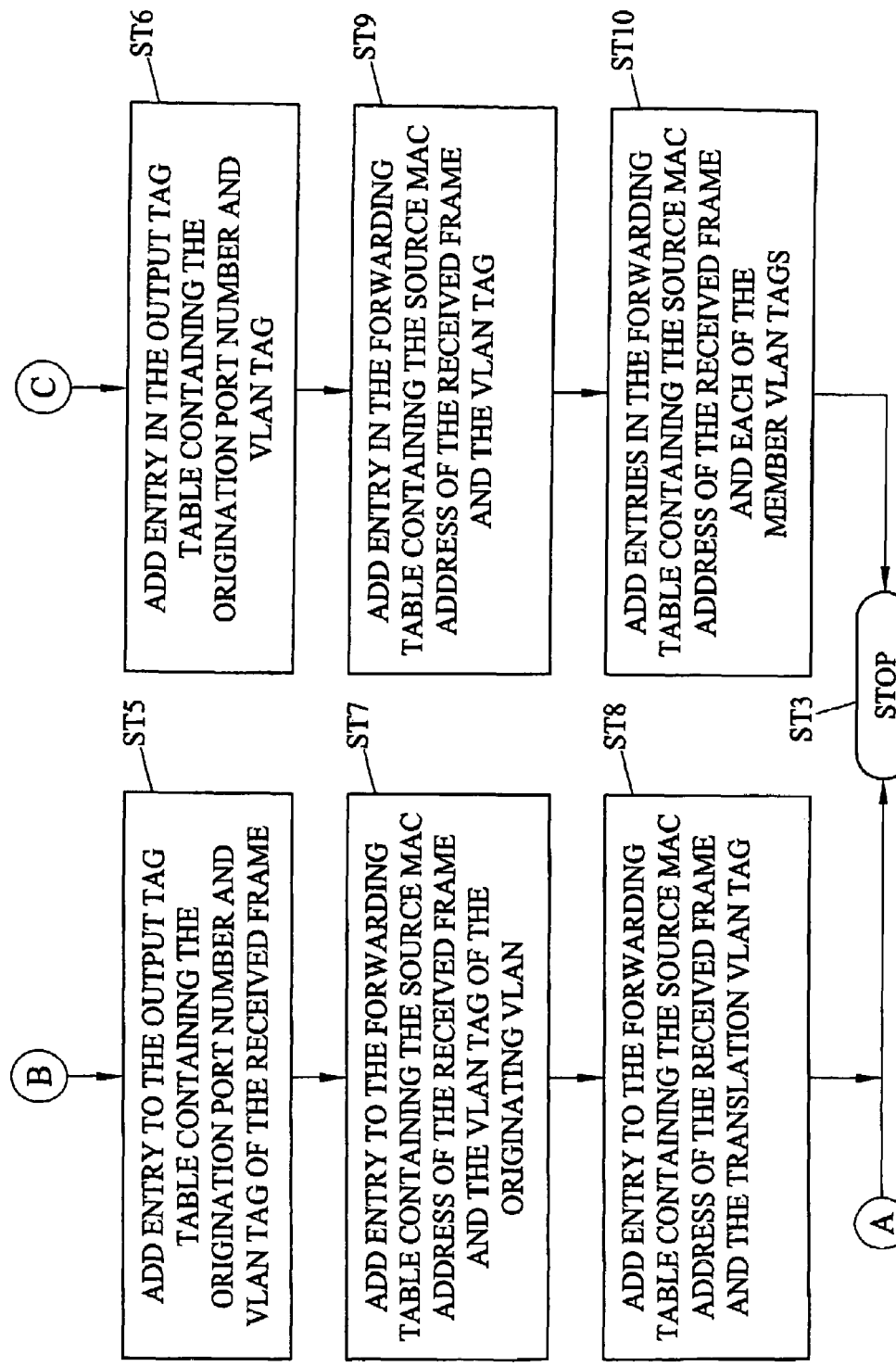

FIGS. 5A and 5B are a flow chart illustrating exemplary steps that may be performed by table control module 218 in learning unknown source MAC addresses from received layer 2 frames. Referring to FIG. 5A, in step ST1, a layer 2 frame is received at a port of switching device 112. Next, at step ST2, it is determined whether the source MAC address of the frame is known. Determining whether the source MAC address is known may include performing a lookup in forwarding table 214 to determine whether an entry corresponding to the source MAC address exists. If an entry exists, the source MAC address is known. If an entry does not exist, the source MAC address is not known. If the source MAC address is known, the learning process ends (step ST3). Otherwise, the learning process proceeds to step ST4.

At step ST4, it is determined whether the frame originated from a member VLAN or translation VLAN. Referring to FIG. 5B, if the frame originated from a member VLAN, the process proceeds to step ST5. If the frame originated from a translation VLAN, the process proceeds to step ST6. At step ST5, an entry is added to output tag table 216. The entry contains the origination port number and the VLAN tag of the received frame. Next, at step ST7, an entry is added to forwarding table 214. The entry contains the source MAC address of the received frame and the VLAN of the originating source VLAN. At step ST8, an entry that contains the source MAC address of the received frame and the translation VLAN tag is added to forwarding table 214. The new entries in forwarding table 214 also contain an index that references the new entry in output tag table 216 for indexing the corresponding entries in output tag table 216. Next, the process end at step ST3. Thus, MAC address learning for a member VLAN address associates the source and translation VLANs with the MAC address. The other member VLANs are preferably not associated with the source MAC address in forwarding table 214. Thus, the present invention expands MAC address learning beyond the source VLAN without compromising security among member VLANs.

Returning to the case where the received frame is from the translation VLAN, control proceeds to step ST6 where an entry is added to output tag table 216. The entry contains the origination port number and translation VLAN tag. At step ST9, an entry that contains the source MAC address of the received frame and the translation VLAN tag number is added to forwarding table 214. Next, in step ST10, entries are added to forwarding table 214 for each member VLAN. The entries each contain the source MAC address of the received frame and one of the member VLAN tags. Thus, a unique entry having the source MAC address of the received frame and one of the member VLAN tags is added for each member VLAN. These new entries in the forwarding table also contain an index that references the new entry in output tag table 216 for indexing output tag table 216. Next, the process ends at step ST3. Thus, by updating forwarding table 214 to include entries for all of the member VLANs and the translation VLAN, the learned MAC address may be accessed by all of the member VLANs and the translation VLAN. Such an expansion of MAC address learning is an advancement over conventional VLAN implementations where such learning is confined to a per-VLAN basis.

Frame Switching

Figure 6:
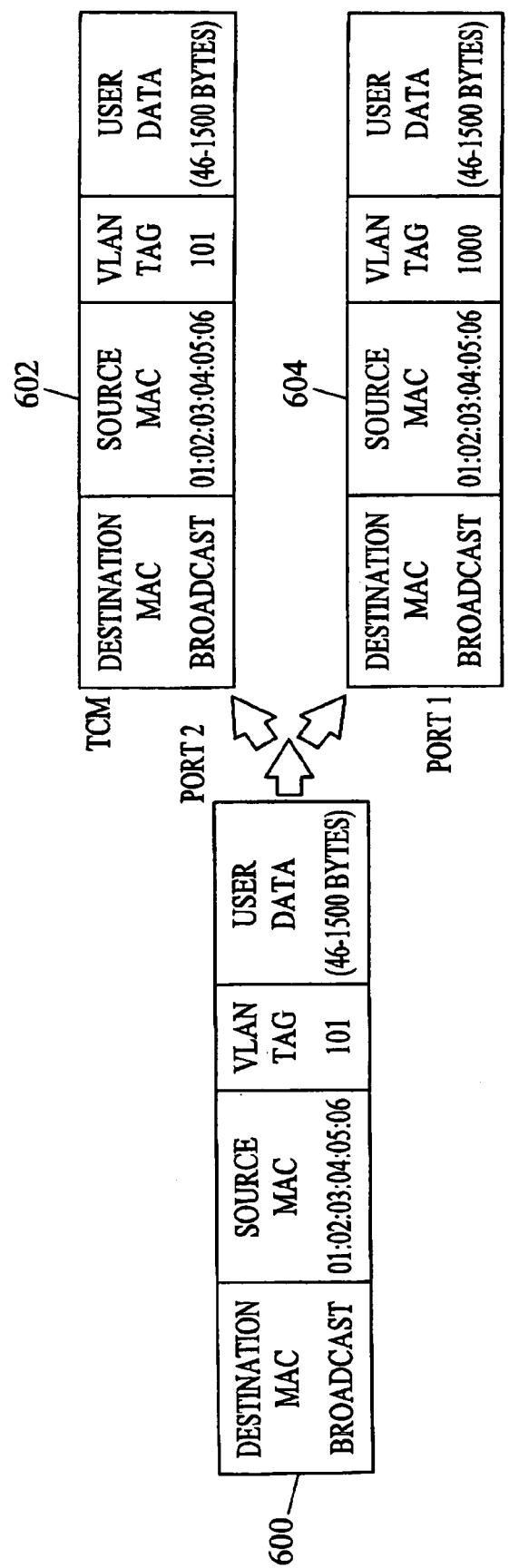
FIG. 6 is a schematic diagram representing the first of four layer 2 frames received on a port of a switching device utilizing VLAN translation and the forwarding of a copy of the frame to an output port of the switching device.
Figure 7:
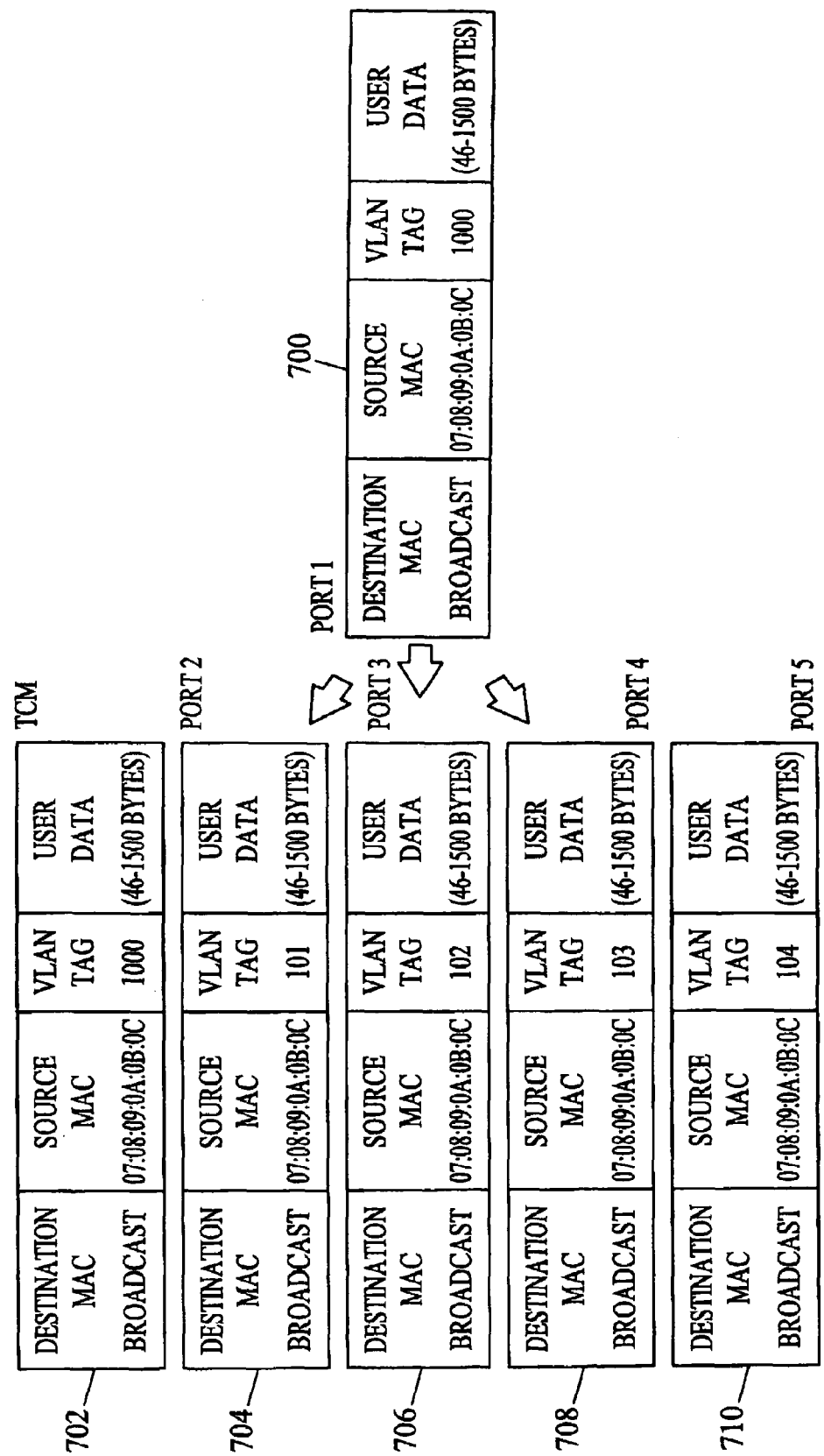
FIG. 7 is a schematic diagram representing the second of the four frames referenced with regard to FIG. 6.

FIGS. 6-9 are schematic diagrams representing layer 2 frames received on a port of switching device 112 utilizing VLAN translation and the forwarding of a copy of the frame to an output port of switching device 112. FIGS. 6-9 are arranged to represent a chronology of four layer 2 frames received by switching device 112 and the resulting output frame copies. In other words, FIG. 6 represents the first layer 2 frame received by the switching device and the resulting output. FIGS. 7-9 represent a chronology of the three frames following the first layer 2 frame. Further, these four frames are assumed to represent the first layer 2 frames received by switching device 112 after initialization of forwarding and output tag tables 214 and 216 with the information shown in Tables 1 and 2 above.

Referring to FIG. 6, an exemplary layer 2 frame 600 is received at port 2 of switching device 112 (shown in FIGS. 1 and 2). Frame 600 includes destination MAC address "Broadcast", source MAC address 01:02:03:04:05:06, and VLAN tag 101. Initially, a lookup may be performed in forwarding table 214, which contains the information illustrated in Table 1 above. The lookup results in retrieval of output tag table index 6 because destination MAC address "Broadcast" and VLAN tag 101 of the frame match the corresponding destination MAC address and input VLAN tag of the entry.

Next, a lookup based on index 6 is performed in output tag table 216, which is assumed to contain the information illustrated in Table 2 above. Index 6 of Table 2 indicates that a copy of the received frame (designated 602) should be forwarded to table control module 218 for further processing. Table 2 index 6 contains index 7 for indicating a lookup in output tag table 216 for index 7.

Index 7 of Table 2 indicates that a copy of the frame should be forwarded to all ports of the member VLAN originating the received frame. Therefore, if ports are available connected to the member VLAN, a copy of the frame is forwarded to the member VLAN ports. The entry corresponding to index 7 in Table 2 returns index 8 for indicating a lookup in output tag table 216 for index 8.

Index 8 indicates that a copy of the frame (designated 604) should be forwarded to all ports of the translation VLAN. Therefore, frame copy 604 is forwarded to port 1 for transmission to the translation VLAN. Frame copy 604 includes a VLAN tag that has been translated from 101 to 1000.

Table control module 218 implements the learning process described above because the source MAC address 01:02:03:04:05:06 of frame 600 is not known (i.e., not present in forwarding table 214). According to the learning process, because the frame originated from a member VLAN, an entry containing source MAC address "01:02:03:04:05:06" and member VLAN tag 101 is added to forwarding table 214. Another entry containing the source MAC address 01:02:03:04:05:06 and translation VLAN tag 1000 is also added to forwarding table 214. These new entries in forwarding table 214 include output tag table index 18 for implementing a lookup in output tag table 216. Table 3 shown below illustrates the result of these entries into forwarding table 214 for the received frame and a description of each entry.

TABLE 3

New Entries to the Forwarding Table

| Destination MAC | Input VLAN Tag | Output Tag Table Index | Description |
| --- | --- | --- | --- |
| 01:02:03:04:05:06 | 101 | 18 | Normal learned entry: Forward traffic for this MAC to member VLAN 101 |
| 01:02:03:04:05:06 | 1000 | 18 | Translation learned entry: Forward traffic destined for this MAC to member VLAN 101 |

Additionally, an entry indexed by 18 is added to output tag table 216. The new entry contains output port number 2, output VLAN tag 101, and next output tag table index "End-of-List". The new entry illustrated in Table 4 indicates that a returned output tag table index of 18 results in a copy of the received frame having VLAN tag 101 being sent to port 2 of switching device 112. Table 4 shown below illustrates the new entry added to output tag table 216.

TABLE 4

New Entry to the Output Tag Table

| Output Tag Table Index | Output Port | Output VLAN Tag | Next Output Tag Table Index | Description |
|---|---|---|---|---|
| 18 | 2 | 101 | End-of-List | Learned entry: Fwd to specific port of member VLAN |

Referring now to FIG. 7, an exemplary layer 2 frame 700 is received at port 1 of switching device 112. Frame 700 includes destination MAC address "Broadcast", source MAC address 07:08:09:0A:0B:0C, and VLAN tag 1000. Initially, a lookup may be performed in forwarding table 214, which now includes the information illustrated in Tables 1 and 3. The lookup results in retrieval of output tag table index 0, because destination MAC address "Broadcast" and VLAN tag 1000 of the frame match the corresponding destination MAC address and input VLAN tag of the entry.

Next, a lookup based on index 0 may be performed in output tag table 216, which now includes the information illustrated in Tables 2 and 4. Index 0 of Table 2 indicates that a copy of the received frame (designated 702) should be forwarded to table control module 218 for further processing. The entry in Table 2 corresponding to index 0 contains index 1 for indicating a lookup in the output tag table for index 1.

Index 1 indicates that a copy of the frame should be forwarded to all ports of the translation VLAN. As shown, the translation VLAN is only connected to port 1 of switching device 112. Therefore, a copy of the frame is forwarded to the translation VLAN ports. Table 2 index 1 returns index 2 for indicating a lookup in the output tag table for index 2.

When an index 2 is returned for Table 2, the entries corresponding to indices 2-5 are accessed in sequence for sending frame copies to all of the ports corresponding to the member VLANs. Frame copies 704, 706, 708, and 710 are sent to ports 2-5, respectively. Frames 704, 706, 708, and 710 include VLAN tags translated to 101, 102, 103, and 104, respectively.

In addition to forwarding the frame copies to the member VLANs, table control module 218 implements the learning process described above because the source MAC address 07:08:09:0A:0B:0C of frame 700 is not known (i.e., not present in forwarding table 214 containing data shown in Table 1 and 3). According to the learning process, because the frame originated from a translation VLAN, an entry containing source MAC address 07:08:09:0A:0B:0C and translation VLAN tag 1000 is added to forwarding table 214. Entries containing source MAC address 07:08:09:0A:0B:0C and each member VLAN tag are also added to forwarding table 214. These new entries in forwarding table 214 include output tag table index 19 for implementing a lookup in output tag table 216. Table 5 shown below illustrates the result of these entries into forwarding table 214 for the received frame.

TABLE 5

Updated Forwarding Table

| Destination MAC | Input VLAN Tag | Output Tag Table Index | Description |
|---|---|---|---|
| 07:08:09:0A:0B:0C | 1000 | 19 | Normal learned entry: Forward traffic destined for this MAC to translation VLAN |
| 07:08:09:0A:0B:0C | 101 | 19 | Translation learned entry: Forward traffic destined for this MAC to translation VLAN |
| 07:08:09:0A:0B:0C | 102 | 19 | Translation learned entry: Forward traffic destined for this MAC to translation VLAN |
| 07:08:09:0A:0B:0C | 103 | 19 | Translation learned entry: Forward traffic destined for this MAC to translation VLAN |
| 07:08:09:0A:0B:0C | 104 | 19 | Translation learned entry: Forward traffic destined for this MAC to translation VLAN |

Additionally, an entry indexed by 19 is added to output tag table 216. The new entry contains output port number 1, output VLAN tag 1000, and next output tag table index "End-of-List". The new entry illustrated in Table 6 indicates that a returned output tag table index of 19 results in a copy of the received frame having VLAN tag 1000 being sent to port 1 of switching device 112. Table 6 shown below illustrates the result of this entry into output tag table 216 for the received frame.

TABLE 6

New Entry to the Output Tag Table

| Output Tag Table Index | Output Port | Output VLAN Tag | Next Output Tag Table Index | Description |
|---|---|---|---|---|
| 19 | 1 | 1000 | End-of-List | Learned entry: Fwd to specific port of translation VLAN |

Referring now to FIG. 8, another exemplary layer 2 frame 800 is received at port 1 of switching device 112. Frame 800 includes destination MAC address 01:02:03:04:05:06, source MAC address 07:08:09:0A:0B:0C, and a VLAN tag 1000. Initially, a lookup may be performed in forwarding table 214, which now includes the information illustrated in Tables 1, 3, and 5. The lookup results in retrieval of output tag table index 18 because destination MAC address 01:02:03:04:05:06 and VLAN tag 1000 of the frame match the corresponding destination MAC address and input VLAN tag of the entry. Next, a lookup based on index 18 may be performed in output tag table 216, which now includes the information illustrated in Tables 2, 4, and 6. Index 18 of Table 6 indicates that a frame copy 802 should be forwarded to port 2 for forwarding to member VLAN with tag 101. The learning process is not implemented because the source MAC address is already known.

Referring now to FIG. 9, another exemplary layer 2 frame 900 is received at port 2 of switching device 112. Frame 900 includes destination MAC address 07:08:09:0A:0B:0C, source MAC address 01:02:03:04:05:06, and a VLAN tag 101. Initially, a lookup may be performed in forwarding table 214, which now includes the information illustrated in Tables 1, 3, and 5. The lookup results in retrieval of output tag table index 19 because destination MAC address 01:02:03:04:05:06 and VLAN tag 1000 of the frame match the corresponding destination MAC address and input VLAN tag of the entry. Next, a lookup based on index 19 may be performed in output tag table 216, which now includes \the information illustrated in Tables 2, 4, and 6. Index 19 of Table 4 indicates that frame copy 902 should be forwarded to a specific port, port 1, of a member VLAN. The learning process is not implemented because the source MAC address is already known.

Thus, the present invention includes methods and systems for associating and translating VLAN tags and replacing existing translated VLAN tags in outgoing layer 2 frames. Multiple member VLANs may be associated with a translation VLAN and a translation VLAN may be associated with multiple member VLANs. The broadcast and flooding domains of the member and translation VLANs are expanded over conventional VLAN switching that limits broadcasting and flooding on a per-VLAN basis. In addition, traffic separation is maintained among member VLANs, providing security and efficiency among member VLANs.

MAC address learning for unknown MAC addresses having the translation VLAN may be performed such that frames containing any of the member VLAN tags may access the specific forwarding table entry corresponding to the learned MAC address in the translation VLAN. MAC address learning frames having any of the member VLANs is preferably confined such that only frames having the translation VLAN or the source VLAN may access the particular entry. By performing learning in such a manner, MAC addresses on individual member VLANs can be maintained in secret from other member VLANs, but not from the translation VLAN. Such a situation may be desirable if the translation VLAN corresponds to an interconnecting network and the member VLANs are managed or used by separate entities.

The present invention is not limited to processing frames with VLAN tags. The present invention may also be used to associate and translate VLAN tags associated with untagged frames. For example, if a frame without a VLAN tag arrives at a particular port of switching device 112, switching device 112 may associate a VLAN tag with the frame based on the input port. Once a VLAN tag is associated with the frame, VLAN translation and association may be performed in the manner described above. That is, if the frame is from a member VLAN and destined for a translation VLAN, the translation VLAN tag may be inserted in the frame before the frame is sent to the translation VLAN. If the frame is from the translation VLAN and destined for a member VLAN, the destination member VLAN tag may be inserted in the frame. Flooding and broadcasting for untagged frames may also be performed in the manner described above.

Although the examples in Table 1 and 2 above indicate that unknown-MAC-addressed and broadcast frames are to be flooded to all ports, including the originating port, in an actual implementation, this may not be the case. It may not be desirable to broadcast or flood frames onto originating ports for efficiency reasons. Accordingly, returning to FIG. 3, in step ST5, classification engines 224 may perform a check to determine whether the inbound and outbound ports associated with a frame are the same. If the inbound and outbound ports are the same, the copy of the frame that was to be forwarded over the output port that corresponds to the input port would be discarded.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for associating and translating virtual local area networks (VLANs) in a layer 2 switch, the method comprising:
   (a) at a first port in a layer 2 switch, receiving a first layer 2 frame addressed to an unknown destination medium access control (MAC) address;
   (b) associating a first VLAN tag with the first layer 2 frame;
   (c) determining whether the first VLAN tag is associated with a member VLAN or a translation VLAN, wherein the translation VLAN includes a VLAN with which multiple different member VLANs are associated by the layer 2 switch;
   (d) in response to determining that the first VLAN tag is associated with a member VLAN, flooding copies of the first layer 2 frame to ports of the member VLAN and to a translation VLAN associated with the member VLAN; and
   (e) in response to determining that the first VLAN tag is associated with a translation VLAN, identifying member VLANs associated with the translation VLAN, flooding copies of the first layer 2 frame to the member VLANs and to ports of the translation VLAN, wherein the copies include different VLAN identifiers corresponding to the different member VLANs.

2. A method for associating and translating virtual local area networks (VLANs) in a layer 2 switch, the method comprising:
   (a) at a first port in a layer 2 switch, receiving a first layer 2 frame addressed to an unknown destination medium access control (MAC) address, wherein receiving a first layer 2 frame includes receiving a layer 2 frame addressed from an unknown unicast MAC address;
   (b) associating a first VLAN tag with the first layer 2 frame;
   (c) determining whether the first VLAN tag is associated with a member VLAN or a translation VLAN;
   (d) in response to determining that the first VLAN tag is associated with a member VLAN, flooding copies of the first layer 2 frame to ports of the member VLAN and to a translation VLAN associated with the member VLAN and learning the unicast MAC address and associating the unicast MAC address with the member VLAN and the translation VLAN; and
   (e) in response to determining that the first VLAN tag is associated with a translation VLAN, identifying member VLANs associated with the translation VLAN, flooding copies of the first layer 2 frame to the member VLANs and to ports of the translation VLAN.

3. A method for associating and translating virtual local area networks (VLANs) in a layer 2 switch, the method comprising:
   (a) at a first port in a layer 2 switch, receiving a first layer 2 frame addressed to an unknown destination medium access control (MAC) address, wherein receiving a first layer 2 frame includes receiving a layer 2 frame from an unknown unicast MAC address;
   (b) associating a first VLAN tag with the first layer 2 frame;
   (c) determining whether the first VLAN tag is associated with a member VLAN or a translation VLAN;
   (d) in response to determining that the first VLAN tag is associated with a member VLAN, flooding copies of the first layer 2 frame to ports of the member VLAN and to a translation VLAN associated with the member VLAN;

(e) in response to determining that the first VLAN tag is associated with a translation VLAN, identifying member VLANs associated with the translation VLAN, flooding copies of the first layer 2 frame to the member VLANs and to ports of the translation VLAN;

(f) learning the unicast MAC address; and (g) in response to determining that the first VLAN tag is associated with a translation VLAN, associating the unicast MAC address with the translation VLAN and the member VLANs associated with the translation VLAN.

4. The method of claim 1 wherein associating a first VLAN tag with the first layer 2 frame includes extracting the first VLAN tag from a tagged layer 2 frame.

5. The method of claim 1 wherein associating a first VLAN tag with a received layer 2 frame includes determining a VLAN tag for an untagged layer 2 frame.

6. A method for associating and translating virtual local area networks (VLANs) in a layer 2 switch, the method comprising:

(a) at a first port in a layer 2 switch, receiving a first layer 2 frame addressed to an unknown destination medium access control (MAC) address;

(b) associating a first VLAN tag with the first layer 2 frame;

(c) determining whether the first VLAN tag is associated with a member VLAN or a translation VLAN;

(d) in response to determining that the first VLAN tag is associated with a member VLAN, flooding copies of the first layer 2 frame to ports of the member VLAN and to a translation VLAN associated with the member VLAN and replacing the first VLAN tag in the copy of the first layer 2 frame flooded to the ports of the translation VLAN with a VLAN tag associated with the translation VLAN; and (e) in response to determining that the first VLAN tag is associated with a translation VLAN, identifying member VLANs associated with the translation VLAN, flooding copies of the first layer 2 frame to the member VLANs and to ports of the translation VLAN.

7. The method of claim 1 wherein step (d) includes flooding copies of the layer 2 frame to ports of the member VLAN other than the first port.

8. A method for associating and translating virtual local area networks (VLANs) in a layer 2 switch, the method comprising:

(a) at a first port in a layer 2 switch, receiving a first layer 2 frame addressed to an unknown destination medium access control (MAC) address;

(b) associating a first VLAN tag with the first layer 2 frame;

(c) determining whether the first VLAN tag is associated with a member VLAN or a translation VLAN;

(d) in response to determining that the first VLAN tag is associated with a member VLAN, flooding copies of the first layer 2 frame to ports of the member VLAN and to a translation VLAN associated with the member VLAN; and (e) in response to determining that the first VLAN tag is associated with a translation VLAN, identifying member VLANs associated with the translation VLAN, flooding copies of the first layer 2 frame to the member VLANs and to ports of the translation VLAN and replacing the first VLAN tag in the copy of the first layer 2 frame flooded to the translation VLAN with a VLAN tag associated with the translation VLAN and replacing the first VLAN tag in the copies of the first layer 2 frame flooded to the member VLANs with VLAN tags associated with the member VLANs.

9. The method of claim 1 wherein step (e) includes flooding copies of the layer 2 frame to ports of the translation VLAN other than the first port.

10. A method for associating and translating virtual local area networks (VLANs) in a layer 2 switch, the method comprising:

(a) at a first port in a layer 2 switch, receiving a first layer 2 frame addressed to an unknown destination medium access control (MAC) address;

(b) associating a first VLAN tag with the first layer 2 frame;

(c) determining whether the first VLAN tag is associated with a member VLAN or a translation VLAN;

(d) in response to determining that the first VLAN tag is associated with a member VLAN, flooding copies of the first layer 2 frame to ports of the member VLAN and to a translation VLAN associated with the member VLAN;

(e) in response to determining that the first VLAN tag is associated with a translation VLAN, identifying member VLANs associated with the translation VLAN, flooding copies of the first layer 2 frame to the member VLANs and to ports of the translation VLAN;

(f) at a second port in the layer 2 switch, receiving a second layer 2 frame addressed to a broadcast MAC address and including a second VLAN tag;

(g) determining whether the second VLAN tag is associated with a translation VLAN or a member VLAN;

(h) in response to determining that the second VLAN tag is associated with a member VLAN, broadcasting copies of the second layer 2 frame to ports of the member VLAN of the second layer 2 frame and to a translation VLAN associated with the member VLAN; and (i) in response to determining that the second VLAN tag is associated with a translation VLAN, broadcasting copies of the second VLAN layer 2 frame to ports of the translation VLAN and to a plurality of member VLANs associated with the translation VLAN.

11. The method of claim 10 wherein step (h) includes replacing the second VLAN tag in the copies of the second layer 2 frame broadcast to ports of the member VLAN with a VLAN tag associated with the member VLAN.

12. The method of claim 10 wherein step (i) includes replacing the second VLAN tag in the copies of the second layer 2 frame broadcast to ports of the translation VLAN with a VLAN tag associated with the translation VLAN and replacing the second VLAN tag in the copies of the second layer 2 frame flooded to the member VLANs with VLAN tags associated with the member VLANs.

13. The method of claim 10 wherein step (h) includes broadcasting copies of the second layer 2 frame to ports of the member VLAN other than the second port.

14. The method of claim 10 wherein step (i) includes broadcasting copies of the second layer 2 frame to ports of the translation VLAN other than the second port.

15. A method for associating and translating virtual local area networks (VLANs) in a layer 2 switch, the method comprising:

(a) at a first port in a layer 2 switch, receiving a first layer 2 frame addressed to an unknown destination medium access control (MAC) address;

(b) associating a first VLAN tag with the first layer 2 frame;

(c) determining whether the first VLAN tag is associated with a member VLAN or a translation VLAN;

(d) in response to determining that the first VLAN tag is associated with a member VLAN, flooding copies of the first layer 2 frame to ports of the member VLAN and to a translation VLAN associated with the member VLAN;

(e) in response to determining that the first VLAN tag is associated with a translation VLAN, identifying member VLANs associated with the translation VLAN, flooding copies of the first layer 2 frame to the member VLANs and to ports of the translation VLAN;

(f) receiving a second layer 2 frame addressed to a known unicast destination MAC address and having a second VLAN identifier;

(g) identifying an output port associated with the known destination MAC address;

(h) forwarding a copy of the second layer 2 frame to the output port associated with the known unicast destination MAC address; and (i) replacing the second VLAN identifier in the copy of the second layer 2 frame with a VLAN identifier associated with the output port.

16. The method of claim 15 wherein replacing the second VLAN identifier includes performing a lookup in a forwarding database using the first VLAN identifier and the known unicast MAC address, extracting an index to an output tag database, accessing the output tag database using the index, and extracting the second VLAN identifier from an entry in the output tag database corresponding to the index.

17. A method for associating and translating virtual local area networks (VLANs) in a layer 2 switch, the method comprising:

(a) at a first port in a layer 2 switch, receiving a first layer 2 frame addressed to an unknown destination medium access control (MAC) address;

(b) associating a first VLAN tag with the first layer 2 frame;

(c) determining whether the first VLAN tag is associated with a member VLAN or a translation VLAN;

(d) in response to determining that the first VLAN tag is associated with a member VLAN, flooding copies of the first layer 2 frame to ports of the member VLAN and to a translation VLAN associated with the member VLAN;

(e) in response to determining that the first VLAN tag is associated with a translation VLAN, identifying member VLANs associated with the translation VLAN, flooding copies of the first layer 2 frame to the member VLANs and to ports of the translation VLAN; and (f) determining whether an output port to which one of the copies of the first layer 2 frame is untagged, and, in response, stripping the first VLAN tag from the layer 2 frame copy destined for the untagged port.

18. A method for maintaining associations between VLANs in a layer 2 switch, the method comprising:

(a) maintaining a first data structure in a layer 2 switch that associates destination media access control (MAC) addresses and VLAN tags with indices to a second data structure;

(b) maintaining a second data structure indexed by the indices from the first data structure and that associates output VLAN tags and output ports with entries in the first data structure;

(c) in response to receiving a layer 2 frame including a first destination MAC address and associated with a first VLAN tag, performing a lookup in the first data structure using the first destination MAC address and the first VLAN tag and obtaining a first index to the second data structure;

(d) performing a lookup in the second data structure based on the first index;

(e) extracting, from the second data structure, a plurality of VLAN tags associated with the first VLAN tag;

(f) generating copies of the first layer 2 frame;

(g) replacing the first VLAN tag in each of the copies with the VLAN tags associated with the first VLAN tag; and (h) forwarding the copies to VLANs associated with each VLAN tag.

19. The method of claim 18 wherein maintaining first and second data structures includes maintaining first and second tables.

20. The method of claim 18 wherein maintaining first and second data structures includes associating translation VLANs with a plurality of member VLANs in the first and second data structures.

21. The method of claim 18 wherein forwarding the copies to the VLANs associated with each VLAN tag includes forwarding copies of broadcast frames from member VLANs to a translation VLAN associated with each member VLAN but not to other member VLANs.

22. The method of claim 20 wherein forwarding the copies to the VLANs associated with each VLAN tag includes forwarding copies of broadcast frames from a translation VLAN to all of the member VLANs associated with the translation VLAN.

23. The method of claim 20 wherein forwarding the copies to the VLANs associated with each VLAN tag includes flooding copies of frames addressed to unknown unicast MAC addresses from member VLANs to a translation VLAN associated with each member VLAN but not to other member VLANs.

24. The method of claim 20 wherein forwarding the copies to the VLANs associated with each VLAN tag includes flooding copies of frames addressed to unknown unicast MAC addresses from a translation VLAN to all of the member VLANs associated with the translation VLAN and to the translation VLAN.

25. The method of claim 20 wherein maintaining first and second data structures includes learning MAC addresses in a manner that associates, in a forwarding table, MAC addresses in member VLANs with a translation VLAN and the source member VLAN but not with other member VLANs.

26. A system for associating virtual local area networks (VLANs) in a layer 2 switch, the system comprising:

(a) at least one input/output (I/O) module for receiving, at a first port in a switched network element, a first layer 2 frame addressed to an unknown destination medium access control (MAC) address; and (b) a classification engine operatively associated with the I/O module for associating the first layer 2 frame with a first VLAN tag, for determining whether the first VLAN tag is associated with a member VLAN or a translation VLAN, wherein the translation VLAN includes a VLAN with which multiple different member VLANs are associated by the layer 2 switch and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN, wherein the copies include different VLAN identifiers corresponding to the different member VLANs.

27. The system of claim 26 wherein the classification engine is adapted to extract the first VLAN tag from the first layer 2 frame.

28. The method of claim 26 wherein the classification engine is adapted to determine the first VLAN tag based on the first port.

29. The system of claim 26 comprising a forwarding data structure accessible by the classification engine for associating destination MAC addresses and VLAN tags with output ports and member and translation VLAN tags.

30. The system of claim 29 wherein the forwarding data structure includes a first table indexed by a combination of MAC address and VLAN tag and containing indices associated with member and translation VLAN tags.

31. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address;
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN; and
   (c) a forwarding data structure accessible by the classification engine for associating destination MAC addresses and VLAN tags with output ports and member and translation VLAN tags, wherein the forwarding data structure includes a first table indexed by a combination of MAC address and VLAN tag and containing indices associated with member and translation VLAN tags and wherein the forwarding data structure includes a second table indexed by the indices from the first table and including the member and translation VLAN tags to be used in outgoing frames.

32. The system of claim 31 wherein the second table includes a plurality of entries associated with each MAC address and VLAN tag combination in the first table and wherein the classification engine is adapted to forward layer 2 frames to multiple VLANs based on a single lookup in the first table.

33. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN wherein the classification engine is adapted to replace VLAN tags in the copies of the first layer 2 frame with VLAN tags associated with the member and translation VLANs.

34. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN wherein the classification engine is adapted not to forward the layer 2 broadcast traffic from the member VLAN to other member VLANs associated with the translation VLAN.

35. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN wherein the classification engine is adapted to forward layer 2 broadcast traffic from a member VLAN to ports of the member VLAN and to a translation VLAN associated with the member VLAN.

36. The system of claim 26 wherein the classification engine is adapted to forward layer 2 unicast traffic addressed to known MAC addresses to output ports associated with the MAC addresses.

37. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN, wherein the classification engine is adapted to forward layer 2 unicast traffic addressed to known MAC addresses to output ports associated with the MAC addresses, and wherein the classification engine is adapted to replace VLAN tags in the layer 2 unicast traffic with VLAN tags associated with the output ports.

38. The system of claim 26 comprising a table control module operatively associated with the classification engine for performing selective MAC address learning for layer 2 frames from unknown MAC addresses.

39. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN
   (c) a table control module operatively associated with the classification engine for performing selective MAC address learning for layer 2 frames from unknown MAC addresses, wherein the table control module is adapted to associate a learned source MAC address from a member VLAN with the member VLAN and with a translation VLAN associated with the member VLAN so that frames from the member VLAN or the translation VLAN can access a forwarding table entry corresponding to the learned MAC address.

40. The system of claim 39 wherein the table control module is adapted not to associate the learned source MAC address with other member VLANs associated with the translation VLAN.

41. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN
   (c) a table control module operatively associated with the classification engine for performing selective MAC address learning for layer 2 frames from unknown MAC addresses wherein the table control module is adapted to associate a learned source MAC address from a translation VLAN with the translation VLAN and with member VLANs associated with the translation VLAN so that frames from the member VLANs or the translation VLAN can access a forwarding table entry corresponding to the learned MAC address.

42. The system of claim 26 wherein, in response to determining that the first VLAN tag is associated with a member VLAN, the classification engine is adapted to flood copies of the first layer 2 frame to ports of the member VLAN other than the first port.

43. The system of claim 42 wherein, in response to determining that the first VLAN tag is associated with a translation VLAN, the classification engine is adapted to flood copies of the first layer 2 frame to ports of the translation VLAN other than the first port.

44. A system for associating virtual local area networks (VLANs) in a layer 2 switch, the system comprising:
   (a) at least one input/output (I/O) module for receiving, at a first port in a switched network element, a first layer 2 frame addressed to an unknown destination medium access control (MAC) address; and
   (b) a classification engine operatively associated with the I/O module for associating the first layer 2 frame with a first VLAN tag, for determining whether the first VLAN tag is associated with a member VLAN or a translation VLAN, and, in response to determining that the first VLAN tag is associated with a member VLAN, flooding copies of the first layer 2 frame to the member VLAN and to a translation VLAN, and, in response to determining that the first VLAN tag is associated with a translation VLAN, for flooding copies of the first layer 2 frame to member VLANs associated with the translation VLAN and to ports of the translation VLAN wherein the classification engine is adapted to strip the first VLAN tag from copies of the first layer 2 frame destined for untagged ports.

* * * * *